Nov. 17, 1970   F. H. STITES   3,541,310
CODING ARRANGEMENT

Filed April 17, 1968   4 Sheets-Sheet 1

INVENTOR.
FRANCIS H. STITES

BY Elmer J. Nealon
ATTORNEY.

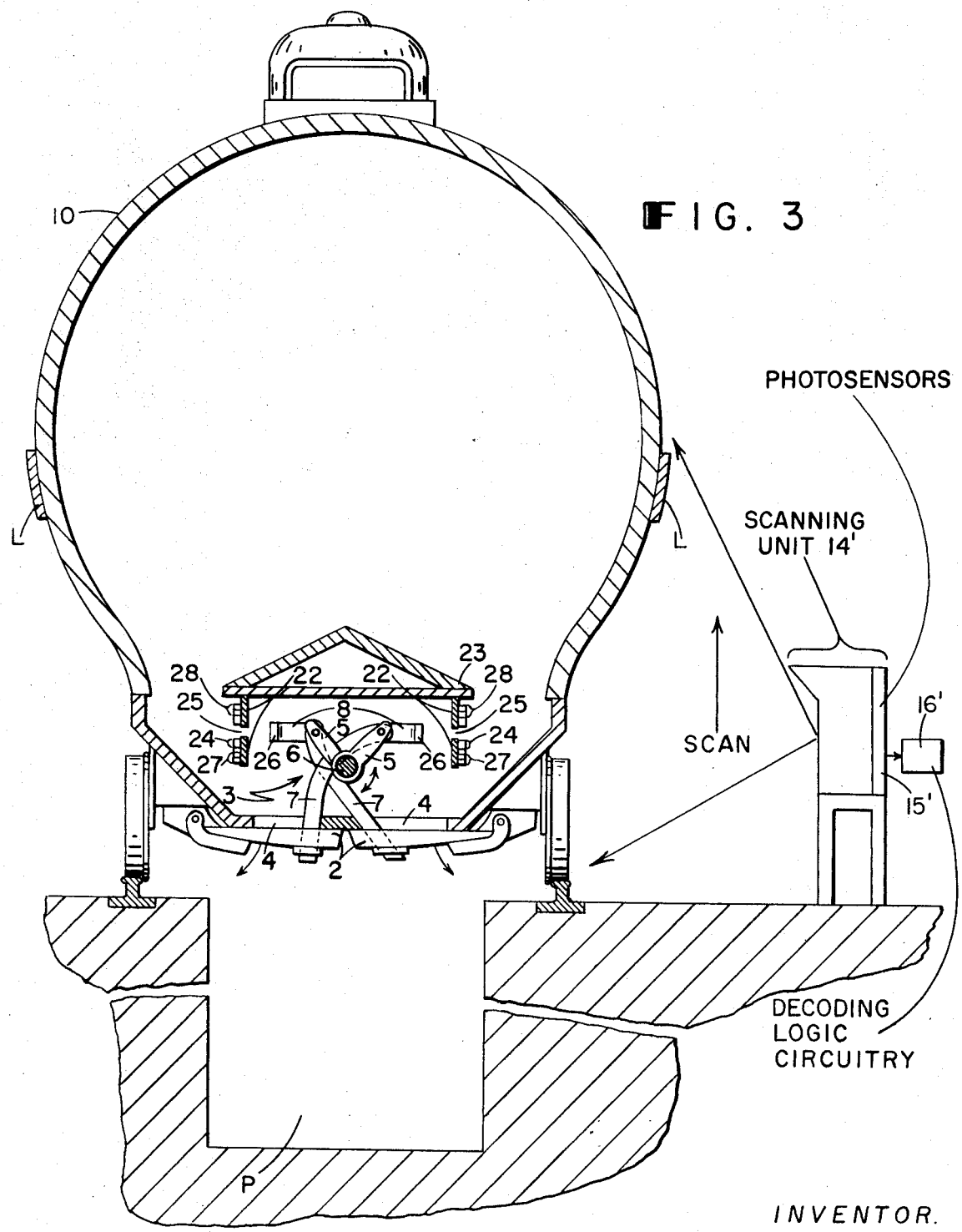

Nov. 17, 1970   F. H. STITES   3,541,310
CODING ARRANGEMENT
Filed April 17, 1968   4 Sheets-Sheet 3
FIG. 4(a)
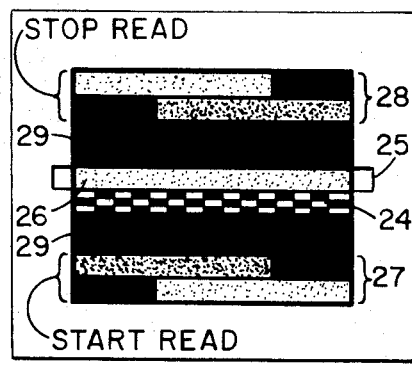
(CLOSED DOOR CONDITION)
FIG. 4(b)
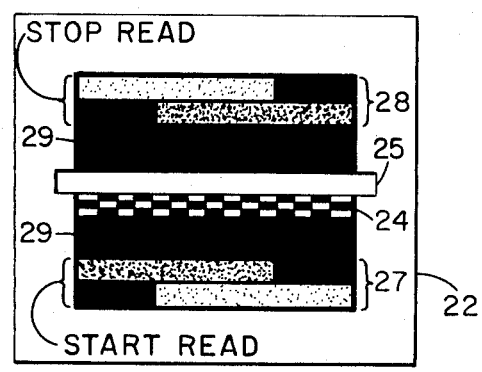
(OPEN DOOR CONDITION)
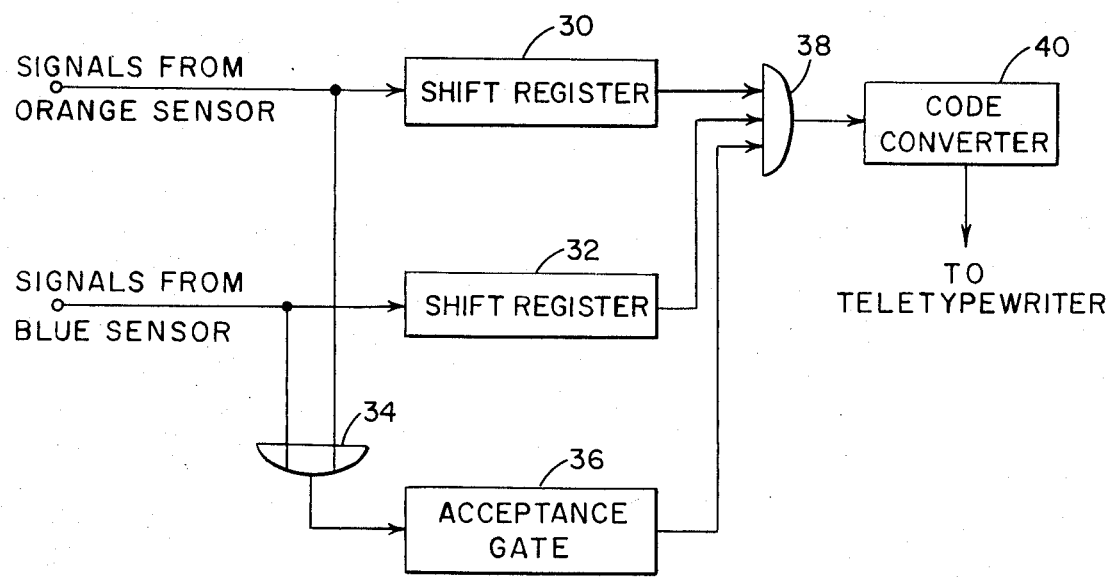
FIG. 5
INVENTOR.
FRANCIS H. STITES
BY *Elmer J. Nealon*
ATTORNEY.

Nov. 17, 1970   F. H. STITES   3,541,310
CODING ARRANGEMENT

Filed April 17, 1968   4 Sheets-Sheet 4

INVENTOR.
FRANCIS H. STITES

BY *Elmer J. Kealon*

ATTORNEY.

United States Patent Office 3,541,310
Patented Nov. 17, 1970

3,541,310
CODING ARRANGEMENT
Francis H. Stites, Wayland, Mass., assignor to Sylvania Electric Products Inc., a corporation of Delaware
Continuation-in-part of application Ser. No. 491,772, Sept. 30, 1965. This application Apr. 17, 1968, Ser. No. 722,035
Int. Cl. B61l 3/06; G06k 7/10, 9/13, 19/04
U.S. Cl. 235—61.11                                    16 Claims

ABSTRACT OF THE DISCLOSURE

An electro-optical mark sensing system including in a preferred embodiment a two-stripe coding format for detecting open and closed positions of a hopper car door. A first of two retroreflective stripes is disposed parallel to and adjacent to a horizontally-oriented aperture provided in a mounting plate, and a second retroreflective stripe is disposed parallel to and behind the aperture on a moving member coupled to a mechanism for opening and closing the door. When the door is moved to a closed position, the second stripe appears behind the aperture and a scanner "reads" both stripes and produces a coded signal which is decoded to indicate the closed position. When the door is opened, the moving member moves the second stripe from behind the aperture, and the scanner "reads" only the first stripe, and produces a coded signal which is decoded to indicate the open position. "START READ" stripes and "STOP READ" stripes are also provided on the mounting plate to prevent extraneous light from being processed and erroneously decoded. A number of modifications and variations of the the above-described arrangement are also disclosed.

CROSS-REFERENCE TO RELATED APPLICATION

The present application is a continuation-in-part of a co-pending application of Francis H. Stites for an invention entitled "Coding Arrangement," Ser. No. 491,772, filed Sept. 30, 1965, now abandoned, and assigned to the assignee of the present application.

BACKGROUND OF THE INVENTION

The present invention relates to electro-optical mark sensing systems and to coding formats useful therewith.

A label reading system for identfying railroad cars or other vehicles has been described in a patent to Francis H. Stites and Raymond Alexander, Pat. No. 3,225,177, and in a patent of Francis H. Stites and Bradstreet J. Vachon, Pat. No. 3,417,231, filed July 30, 1964, both assigned to the assignee of the present application. As disclosed in the above-mentioned patents, coded labels are affixed to the sides of railroad cars and are read by a track-side optical scanning unit which translates the coded information into car identification numbers or other information pertaining to the cars. The labels are typically fabricated from colored stripes of retroreflective and nonretroreflective material and are suitably-coded in a two-position base-four code by various two-stripe combinations of four colors, orange, blue, white, and black, to represent start and stop signals and the decimal digits zero through nine. The various stripes employed in a label are mounted in a vertical array on the side of a vehicle to be identified, each of the stripes being disposed on the vehicle with a horizontal orientation.

The trackside optical scanning unit typically includes a source of light and a rotating or scanning drum having a plurality of mirrors mounted around its periphery. As the drum rotates, the mirrors cause a light beam to vertically scan the label from bottom to top. The light retroreflected from the stripes of the label is divided by a dichroic optical system into orange and blue light which is applied to respective photo-sensors, the output signals of which are coded pulses representative of the particular label digits read by the scanning unit. These signals are then processed to provide the requisite decoded information.

It has been found that a label reading system of the type described hereinabove is also useful to provide other information. For example, in the railroad industry, it is often desirable to detect when doors located on the bottom of a hopper car are in an open position such that improper discharge of the contents of the hopper car can be prevented. One conventional technique for sensing the position of a door is to provide a label on the door, which label is in a position to be sensed when the door is closed but not when the door is open. In practical mark sensing systems, however, the absence of a label is not easily detected since it often cannot be distinguished from background noise. One way of obviating this problem is to provide two labels, one of which is sensed when the door is closed and the other of which is sensed when the door is open. Such a label arrangement is, however, inconvenient or impossible in some instances due to the construction of the vehicle on which it is desired to place the labels.

SUMMARY OF THE INVENTION

Briefly, in accordance with the present invention, an electro-optical mark sensing system is provided for indicating a first position of an object relative to a body and a position of the object other than the first position. An electro-optical mark sensing system in accordance with a preferred form of the invention includes a first retroreflective stripe associated with the object and a second retroreflective stripe associated with the body. When the object is in the first position, a means associated with the object is adapted to provide a first positional relationship between the first and second retroreflective stripes, and the stripes are scanned with incident light from a scanning means.

The pattern of light retroreflected from the stripes while in the first positional relationship is received by a signal translating means which produces a first electrical signal representative of the retroreflected pattern of light, and the first electrical signal is applied to a decoding means coupled to the signal translating means. In response to receiving the first electrical signal, the decoding means produces a signal indicating that the object is in the first position.

When the object is in a position other than the first position, the means associated with the object provides a positional relationship between the stripes which differs from the first positional relationship. The stripes are scanned by the scanning means and the light pattern retroreflected from the stripe while in the different positional relationship is received by the signal translating means. A second electrical signal is produced thereby and applied to the decoding means. In response thereto, the decoding means produces a signal indicating that the object is in a position other than the first position.

In addition to the two-stripe arrangement briefly described hereinabove, a number of three- and four-stripe arrangements representing variations and modifications of the above-described two-stripe arrangement are also described hereinafter.

BRIEF DESCRIPTION OF THE DRAWING

FIG. 3 is an end view, partly in cross-section, of a hopper car employing a coding arrangement for detecting the open and closed positions of doors therein;

FIGS. 4a and 4b are diagrammatic representations of a coding arrangement used with the hopper car of FIG. 3, FIG. 4a representing the nature of the coding arrangement when a door of the hopper car is closed, and FIG. 4b representing the nature of the coding arrangement when a door of the hopper car is open;

FIG. 5 is a block diagram representation of decoding logic circuitry useful in processing data derived from scanning retroreflective stripes used in the coding arrangement of FIGS. 4a and 4b.

DESCRIPTION OF THE PREFERRED EMBODIMENT OF THE INVENTION

Figure 1:
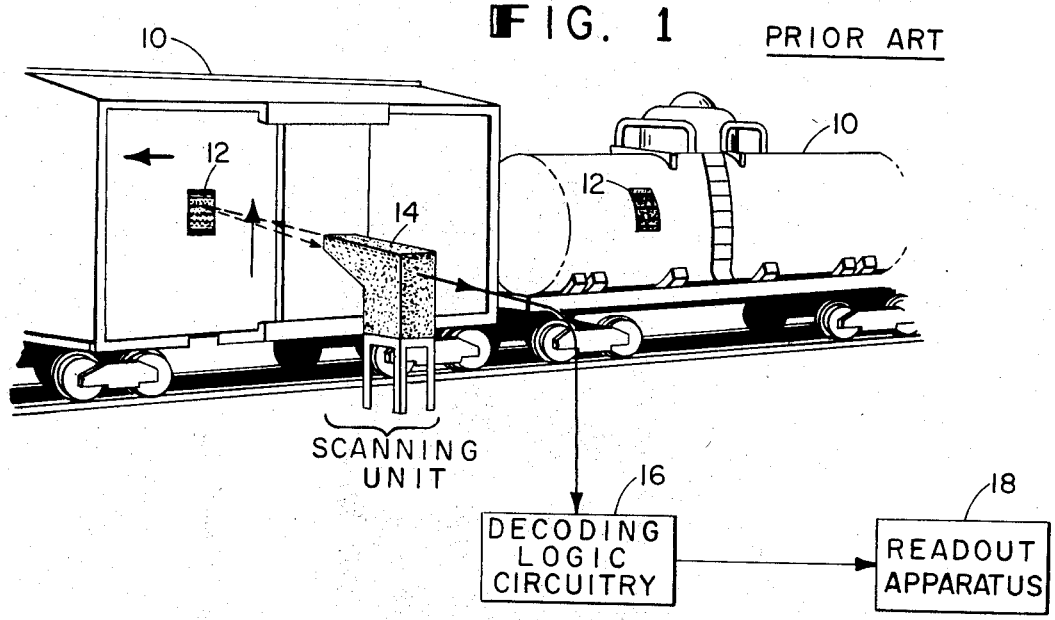
FIG. 1 is a diagrammatic representation of a prior art mark sensing system useful as an aid to understanding the present invention.

Prior art railroad car identification system—FIG. 1

To aid in understanding the present invention, it will be helpful to consider a railroad car identification system of the type described in the above-mentioned patent and copending application both of which employ the two-position base-four coding format which is particularly useful in the present invention. Referring to FIG. 1, there is shown a railroad car 10 provided with a retroreflective coded label 12 on the side thereof, and a trackside optical scanning unit 14 which is adapted to repetitively vertically scan the stripes comprising the label 12. The retroreflected light returned from the coded stripes of the label 12 in response to being scanned by the scanning unit 14 is received by the scanning unit and is transduced into electrical signals which are applied to suitable decoding logic circuitry 16, the output signal of which is representative of the information encoded in the label 12. The output signal from the decoding logic circuitry 16 is applied to and operates a conventional readout apparatus 18, such as a teletypewriter.

Figure 2:
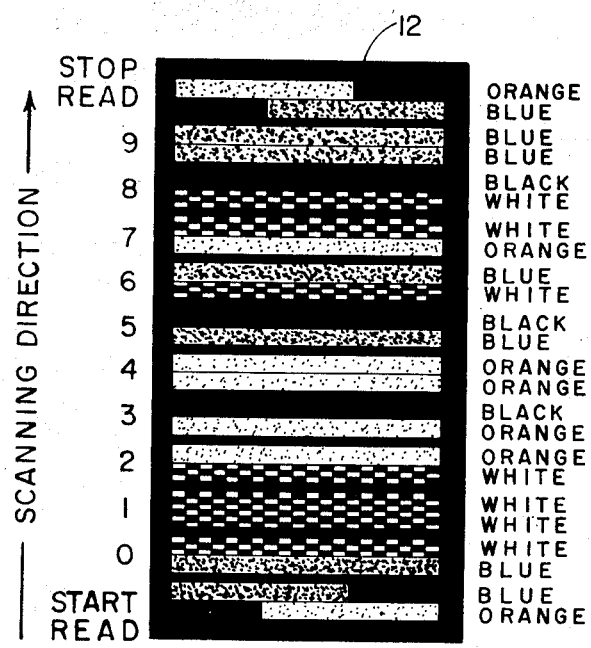
FIG. 2 is a representation of a prior art coded-label format useful as an aid to understanding the present invention.

Prior art retroflective coded label—FIG. 2

The exemplary prior art encoded label 12 of FIG. 1, illustrated in greater detail in FIG. 2, is fabricated from a pressure-sensitive adhesive-backed retroreflective material, such as that sold commercially by the 3M Company, St. Paul, Minn., under the trademark Scotchlite. START and STOP data in addition to the digital information identifying the railroad car 10 are coded by means of a plurality of two-stripe combinations of orange, blue, and white retroreflective stripes, and black nonretroreflective stripes, arranged in a vertical succession and with a horizontal orientation. Since each unit or bit or information is represented by two stripes selected from four possible colors, a so-called two-position base-four code results.

As shown in FIG. 2, the label 12 includes, from bottom to top, "START READ" code stripes, stripes representing the decimal numbers zero through nine, and "STOP READ" code stripes. The START READ stripes and STOP READ stripes, in response to being scanned by the scanning unit 14, cause the operation of the logic decoding circuitry 16 to be initiated and terminated, respectively, so as to prevent processing of spurious light reaching the scanning unit 14 during such time that a label is not present in front of the scanning unit 14. The orange and blue retroreflective stripes reflect light, respectively, in the orange and blue spectrum, while the white retroreflective stripes reflect light in both the orange and blue spectrum. The black stripes are ideally non-retroreflective. However, the absence of reflected light from the black stripes is utilized together with the orange, blue, and white light reflections to provide the four elements of the code. Although not shown in detail in FIG. 1, suitable photo-responsive sensors within the scanning unit 14 are rendered operative in response to combinations of light received in the orange and blue spectrum, or the absence thereof, to produce electrical signals representative of the reflected light patterns returned from the various stripes of the label 12. These electrical signals are decoded by the decoding logic circuitry 16 and a suitable readout of the identification number of the railroad car 10, as well as any other encoded information, is provided by the readout apparatus 18. While in practice it is possible for the black stripes to reflect some light, for example, if dust is present, the color black is measured relative to the adjacent colored stripes which possess a much greater reflecting ability. Thus, suitable threshold circuitry may be provided to insure detection of the black stripes.

Detection of open and closed positions of hopper doors—FIGS. 3, 4a, and 4b

A two-stripe code format such as illustrated by one of the coded digits 0 through 9 in FIG. 2 is employed in a mark sensing system of the present invention to distinguish between and indicate the open and closed positions of hopper car doors. FIG. 4a illustrates a particular two-stripe code arrangement suitable for this purpose. FIG. 3 illustrates a typical application of the code arrangement of FIG. 4a as applied to a hopper car. Referring to FIG. 3, there is shown a hopper car 10 which is provided with a pair of hinged doors 2 in a bottom wall of the car which doors are adapted to be opened and closed by a mechanical arrangement generally shown at 3. The openings of the doors 2 allows the contents of the hopper car 10 to be emptied via a pair of openings 4 located in the bottom of the car 10 into a pit P located beneath the car. The mechanical arrangement 3 typically includes first and second movable arms 5 which are fixed to a shaft 6 which in turn is rotatably mounted with respect to the body of the car. The arrangement 3 also includes a pair of curved movable members 7 each of which is suitably connected at one end to an arm 5 and at the other end to a door 2. Each of the members 7 is adapted to open the associated door 2 when a counter-clockwise motion is imparted to to the shaft 6 by means of a suitable automatic or manually-operated mechanism (not shown), and to close the door when a clockwise motion is imparted to the shaft 6.

The two-stripe code format of the present invention is utilized with the hopper car arrangement shown in FIG. 3 by providing L-shaped members 8 which are suitably fixed to the arms 5. A retroreflective stripe 26 is mounted on the end of the L-shaped members 8. An apertured mounting plate 22 is affixed to a frame portion 23 of the car a slight distance in front of the retroreflective stripe 26. The mounting plate 22 is arranged such that an aperture 25 therein is aligned with the retroreflective stripe 26. A second retroreflective stripe 24, which constitutes the second stripe of the two-stripe arrangement used in the present invention, is affixed to the outside surface of the mounting plate 22 adjacent to the bottom edge of the aperture 25. Additionally, START READ code stripes are affixed below the stripe 24 and STOP READ code stripes 28 are affixed above the aperture 25. As indicated in FIG. 3, the above-described code arrangement is used on both sides of the hopper car 10 to enable the stripes to be read by a scanning unit 14' regardless of which side of the car faces toward the scanning unit 14'.

The above-described two-stripe code arrangement is illustrated in greater detail in FIG. 4a. As shown therein, the retroreflective stripe 26 on the member 8 (FIG. 3) is disposed behind the aperture 25 and the retroreflective stripe 24 on the mounting plate 22 (FIG. 3) is disposed adjacent to the stripe 26 at the bottom edge of the aperture 25. Since the stripe 26 is disposed a slight distance behind the aperture 25, it is made of a slightly larger size than the stripe 24 so as to appear to the scanning unit 14' to be of the same size as the stripe 24. By way of illustration, the stripe 24 may be white and the stripe 26 may be orange, although any of the recognizable 0–9 color-coded combinations (as shown in FIG. 2, for example) may be used.

The START READ and STOP READ stripes, which are disposed below and above the stripe 24 and the aperture 25, respectively, are employed to prevent extraneous light which may enter the scanning unit 14' from being processed and subsequently decoded. The individual stripes constituting the START READ code and the STOP READ code are of a length shorter than the lengths of the other stripes and staggered relative to each other such that the scanning unit 14' reads all of the stripes used in the label of FIG. 4a when the label passes in front of the scanning unit 14', at which time the scanning unit 14' views the entire label. The START READ and STOP READ codes are preferably formed of the color combinations orange-blue and blue-orange, respectively (noting FIG. 2), which color combinations are rarely found in nature, thereby minimizing the reception of spurious signals. In addition to the above-mentioned stripes, black non-retroreflective separators 29 are provided between the aperture 25 and the START READ and STOP READ stripes to further prevent spurious signals from being received from the surface of the mounting plate 22. If desired, the remaining exposed portions of the plate 22 may also be covered with the black nonretroreflective material to prevent still further the receipt of spurious signals.

The operation of the mark sensing system of the present invention to indicate open and closed positions of the doors 2 of the hopper car arrangement of FIG. 3 is as follows. When the doors 2 of the hopper car 10 are in a closed position, the retroreflective stripe 26 is positioned by the member 8 directly behind the aperture 25. When all of the stripes 24, 25, 27, and 28 are in the view of the scanning unit 14', a light beam is directed onto the stripes by the scanning unit 14', from bottom to top, and the incident light is retroreflected from the stripes back to the scanning unit 14'. Suitable photo-sensors or signal translation apparatus 15' included within the scanning unit 14' are activated by the return light to provide a coded signal to be decoded. In the above example, the combination of the white stripe 24 and the orange stripe 26 represents the digit 2 (noting the white-orange combination of FIG. 2). Therefore, the scanning unit 14' and the photosensors 15' produce a coded signal which is decoded to a digit 2 by the associated decoder logic circuitry 16' to indicate the closed door condition.

When the doors 2 are in a position other than the closed position, as by imparting a counter-clockwise motion to the shaft 6 which in turn causes the member 8 to be moved away from behind the aperture 25, the scanning unit 14' reads only the white stripe 24, as shown in FIG. 4b. However, the absence of the orange stripe 26 from behind the aperture 25 is treated in the same manner as a black stripe. The two-color combination of white-black, as indicated in FIG. 2, represents the digit 8. Therefore, when the stripes 24, 27, and 28 are scanned by the scanning unit 14', a coded signal is produced by the photosensors 15' which is then decoded as the digit 8 by the decoding logic circuit 16' to indicate the open condition of the hopper doors 2.

Decoder logic circuitry—FIG. 5

Decoding of the coded signals produced by the photosensors 15' included in the scanning unit 14' is accomplished in the same manner as described in the above-mentioned patent and co-pending application to which reference can be made for greater details. However, for purposes of the present discussion, a typical arrangement of the decoding logic circuitry 16' is shown in FIG. 5. As shown therein, the signals from the "orange" and "blue" photosensors 15' are applied to respective conventional shift registers 30 and 32 and also to a conventional OR gate 34. The output of the OR gate 34 is applied to an acceptance gate 36 which generates, in response to a "START" pulse derived from scanning the START READ stripes, a gate pulse extending over a time interval during which signals are expected to be returned from the various stripes of the label. The output signals of shift registers 30 and 32 and the output gate pulse of the acceptance gate 36 are applied to a conventional AND gate 38 which produces an output signal only when all input signals are present. Both the "START" pulse and a "STOP" pulse (derived from scanning the STOP READ stripes) together with the pulses representative of the white-orange combination or the white-black combination (closed door or open door situations, respectively) must be present during the time interval generated by the acceptance gate 36 in order for decoding and readout to take place. Extraneous noise, therefore, is excluded from the readout. The output signal of the AND gate 38 is then applied to a code converter 40 which translates the label data into a suitable form for operating a teletypewriter or other output device.

Modifications

Although a specific code arrangement including a two-stripe combination and START and STOP READ code stripes has been described hereinabove, it is to be understood that many variations and modifications are possible. For example, additional pairs of stripes may be added to the code arrangement of FIG. 4a, in the manner illustrated in FIG. 2, to represent such information as the owner and number of the car, weight, etc. Also, it is possible to eliminate the mounting plate 22 and the retroreflective stripes thereon and, instead, employ a coded label in line with the stripe 26, such as shown at L in FIG. 3. The coded label L in this even would typically be of the type illustrated in FIG. 2 but would have the positions of the START READ and STOP READ stripes interchanged inasmuch as the label L would be scanned from top to bottom by the scanning unit 14' (rather than bottom to top as before). At a predetermined time after scanning the label L, the scanning unit 14' would then detect the presence or absence of the stripe 26 and produce the appropriate signals to a suitably-modified decoding logic circuitry for further processing.

Figure 6A:
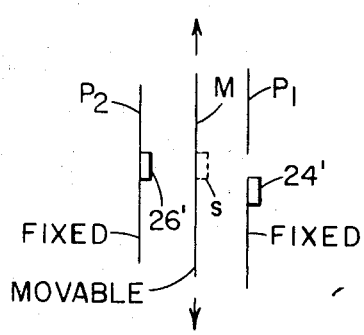
FIGS. 6a through 6e are diagrammatic representations of various modifications and variations of the coding arrangement of the present invention.

Several other modifications of the present invention are illustrated in schematic form in FIGS. 6a through 6e. As shown in FIG. 6a, a retroreflective stripe 24' may be affixed to a fixed apertured plate $P_1$ and a retroreflective stripe 26' may be affixed to a fixed member $P_2$. A movable member M may then be moved in any appropriate direction (as indicated by the arrows) in response to a change in position of an object such as a door so as to appear in front of the stripe 26' and shield or obscure the stripe 26' from the scanning apparatus. It is also possible for a retroreflective stripe s (shown dotted in FIG. 6a) of a retroreflectivity characteristic (color) differing from the retroreflectivity characteristic (color) of the stripe 26' to be affixed to the movable member M so as to be substituted for the stripe 26' when the member M is caused to be moved in front of the stripe 26'.

Figure 6B:
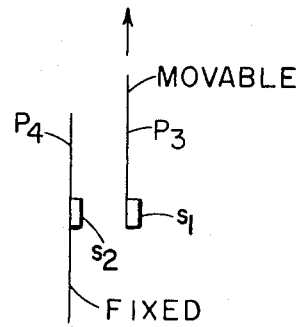
Figure 6C:
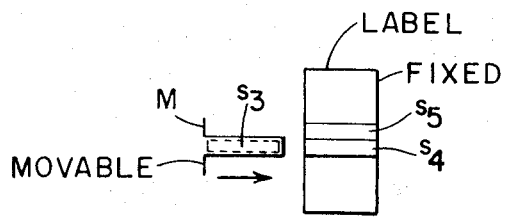
Figure 6D:
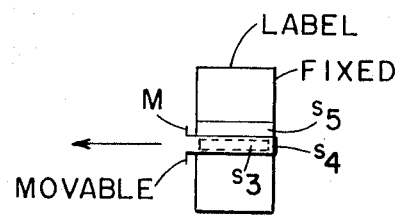
Figure 6E:
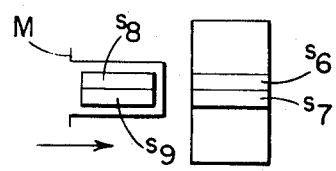

FIG. 6b illustrates an arrangement in which a retroreflective stripe $s_1$ is affixed to a movable member $P_3$ such that the member $P_3$ initially shields a retroreflective stripe $s_2$ affixed to a fixed member $P_4$. The member $P_3$ is adapted to be moved upwardly a distance equal to the height of the stripe $s_2$ in response to a change in position of an object so as to expose both of the stripes $s_1$ and $s_2$ to the scanning apparatus. FIG. 6c illustrates an arrangement in which a movable member M, which may or may not have a retroreflective stripe $s_3$ (shown dotted) affixed thereto, is adapted to be moved in response to a change in position of an object to cover one of two adjacent retroreflective stripes $s_4$ and $s_5$. FIG. 6d illustrates an arrangement similar to that of FIG. 6c wherein the movable member M initially covers the stripe $s_4$ and is adapted to be moved away so as to reveal the stripe $s_4$ to the scanning apparatus. FIG. 6e illustrates an arrangement similar to that of FIG. 6c. However, two pairs of stripes, $s_6$ and $s_7$ and $s_8$ and $s_9$, respectively, are used, the retroreflectivity characteristics (colors) of the stripes $s_8$ and $s_9$ differing from the retroreflectivity characteristics of the corresponding stripes $s_6$ and $s_7$. It is evident that still other code formats and arrangements will suggest themselves to those skilled in the art. Therefore, the invention is not to be limited by what has been particularly shown and described, except as indicated in the appended claims.

What is claimed is:

1. An electro-optical mark sensing system operative to provide indications of a first position of an object relative to a body and a position of the object relative to the body other than the first position comprising:

a first retroreflective stripe associated with the object;

a second retroreflective stripe associated with the body;

means associated with the object and adapted when the object is in the first position to provide a first positional relationship between the first and second retroreflective stripes;

said means associated with the object being further adapted in response to the object being in a position other than the first position to provide a different positional relationship between the first and second retroreflective stripes;

scanning means for scanning the stripes with incident light;

signal translating means adapted to receive the light pattern retroreflected from the stripes while in the first positional relationship and to produce a first electrical signal representative thereof, and to receive the light pattern retroreflected from the stripes while in the different positional relationship and to produce a second electrical signal representative thereof; and decoding means coupled to the signal translating means and adapted to produce a signal indicating that the object is in the first position when the first electrical signal is produced by the signal translating means in response to the stripes being scanned while in the first positional relationship, and to produce a signal indicating that the object is in a position other than the first position when the second electrical signal is produced by the signal translating means in response to the stripes being scanned while in the different positional relationship.

2. An electro-optical mark sensing system in accordance with claim 1 wherein both of the retroreflective stripes are capable of receiving and retroreflecting incident light from the scanning means when the stripes are in the first positional relationship, and wherein only one of the retroreflective stripes is capable of receiving and retroreflecting incident light from the scanning means when the stripes are in the different positional relationship;

said decoding means being adapted to produce a first signal indicating that the object is in the first position when the first electrical signal is produced by the signal translating means in response to both of the retroreflective stripes receiving and retroreflecting the light from the scanning means, and to produce a second signal indicating that the object is in a position other than the first position when the second electrical signal is produced by the signal translating means in response to only one of the stripes receiving and retroreflecting the light from the scanning means.

3. An electro-optical mark sensing system in accordance with claim 1 wherein only one of the retroreflective stripes is capable of receiving and retroreflecting incident light from the scanning means when the stripes are in the first positional relationship, and wherein both of the retroreflective stripes are capable of receiving and retroreflecting light from the scanning means when the stripes are in the different positional relationship;

said decoding means being adapted to produce a first signal indicating that the object is in the first position when the first electrical signal is produced by the signal translating means in response to only one of the retroreflective stripes receiving and retroreflecting the light from the scanning means, and to produce a second signal indicating that the object is in a position other than the first position when the second electrical signal is produced by the signal translating means in response to both of the stripes receiving and retroreflecting the light from the scanning means.

4. An electro-optical mark sensing system operative to provide indications of open and closed positions of a closure member associated with an opening in the body of a vehicle, said mark sensing system comprising:

a first retroreflective stripe associated with the closure member;

a second retroreflective stripe associated with the body of the vehicle;

means associated with the closure member and adapted when the closure member is in a closed position to provide a first positional relationship between the first and second retroreflective stripes;

said means associated with the closure member being further adapted in response to the closure member being in an open position to provide a different positional relationship between the first and second retroreflective stripes;

scanning means for scanning the stripes with incident light;

signal translating means adapted to receive the light pattern retroreflected from the stripes while in the first positional relationship and to produce a first electrical signal representative thereof, and to receive the light pattern retroreflected from the stripes while in the different positional relationship and to produce a second electrical representative thereof; and decoding means coupled to the signal translating means and adapted to produce a signal indicating that the closure member is in a closed position when the first electrical signal is produced by the signal translating means in response to the stripes being scanned while in the first positional relationship, and to produce a signal indicating that the closure member is in an open position when the second electrical signal is produced by the signal translating means in response to the stripes being scanned while in the different positional relationship.

5. An electro-optical mark sensing system operative to provide indications of a first position of an object relative to a body and a position of the object relative to the body other than the first position comprising:

a first retroreflective stripe associated with the object;

a second retroreflective stripe associated with the body;

scanning means for scanning the stripes with incident light;

means associated with the object and adapted when the object is in the first position to provide a positional relationship between the first and second retroreflective stripes such that both stripes receive and retroreflect incident light from the scanning means;

signal translating means adapted to receive light retroreflected from the stripes and to produce electrical signals representative thereof;

said means associated with the object being further adapted in response to the object being in a position other than the first position to prevent one of the retroreflective stripes from receiving and retroreflecting light from the scanning means; and decoding means coupled to the signal translating means and adapted to produce a signal indicating that the object is in the first position when an electrical signal is produced by the signal translating means in response to both of the stripes receiving and retroreflecting the light from the scanning means, and to produce a signal indicating that the object is in a position other than the first position when an electrical signal is produced by the signal translating means in response to only one of the stripes receiving and retroreflecting the light from the scanning means.

6. An electro-optical mark sensing system in accordance with claim 5 wherein the means associated with the object is adapted when the object is in a position other than the first position to place the first retroreflective stripe in a position relative to the scanning means whereby the first stripe is no longer able to receive and to retroreflect light from the scanning means.

7. An electro-optical mark sensing system in accordance with claim 5 wherein the means associated with the object is adapted when the object is in a position other than the first position to shield one of the retroreflective stripes from the incident light from the scanning means whereby the shielded stripe is unable to receive and to retroreflect the light from the scanning means.

8. An electro-optical mark sensing system in accordance with claim 5 wherein the means associated the the object is adapted when the object is in a position other than the first poistion to obscure the first retroreflective stripe with the second retroreflective stripe whereby the first stripe is no longer capable of receiving and retroreflecting the light from the scanning means.

9. An electro-optical mark sensing system operative to provide indications of a first position of an object relative to a body and a position of the object relative to the body other than the first position comprising:

a first retroreflective stripe associated with the object;
second and third retroreflective stripes associated with the body;
the first retroreflective stripe having a retroreflectivity characteristic differing from the retroreflectivity characteristic of the second retroreflective stripe;
scanning means for scanning the stripes with incident light;
means associated with the object and adapted when the object is in the first position to provide a positional relationship between the retroreflective stripes such that both the second and third retroreflective stripes receive and retroreflect light from the scanning means;
signal translating means adapted to receive light retroreflected from the stripes and to produce electrical signals representative thereof;
said means associated with the object being further adapted when the object is in a position other than the first position to place the first stripe in a position so as to obscure the second stripe from the scanning means whereby the first stripe is presented to the scanning means in lieu of the second stripe and the first and third stripes are then both capable of receiving and retroreflecting light from the scanning means; and
decoding means coupled to the signal translating means and adapted to produce a signal indicating that the object is in the first position when an electrical signal is produced by the signal translating means in response to the second and third retroreflective stripes both receiving and retroreflecting the light from the scanning means, and to produce a signal indicating that the object is in a position other than the first position when an electrical signal is produced by the signal translating means in response to the first retroreflective stripe and the third retroreflective stripe receiving and retroreflecting the light from the scanning means.

10. An electro-optical mark sensing system in accordance with claim 9 wherein the second and third retroreflective stripes are positioned one above the other when the object is in the first position, one of the stripes being spaced a greater distance from the scanning means than the other, and wherein the means associated with the object is adapted when the object is in a position other than the first position to cause the first retroreflective stripe to be placed in a position intermediate to the second stripe and the scanning means whereby to obscure the second retroreflective stripe and to prevent the second stripe from then receiving and retroreflecting the light from the scanning means, the first stripe and third stripe then being capable of receiving and retroreflecting the light from the scanning means.

11. An electro-optical mark sensing system in accordance with claim 9 wherein the second and third retroreflective stripes are positioned on the body adjacent to and one above the other when the object is in the first position, both of the stripes being spaced the same distance from the scanning means, and wherein the means associated with the object is adapted when the object is in a position other than the first position to cause the first retroreflective stripe to shield the second retroreflective stripe from the scanning means whereby the second stripe is then prevented from receiving and retroreflecting the light from the scanning means and the first and third stripes are then capable of receiving and retroreflecting the light from the scanning means.

12. A electro-optical mark sensing system operative to provide indications of a first position of an object relative to a body and a position of the object relative to the body other than the first position comprising:

a first retroreflective stripe associated with the object;
second and third retroreflective stripes associated with the body;
the first retroreflective stripe having a retroreflectivity characteristic differing from the retroreflectivity characteristic of the second retroreflective stripe;
scanning means for scanning the stripes with incident light;
means associated with the object and adapted when the object is in the first position to provide a positional relationship between the stripes such that the first retroreflective stripe and the third retroreflective stripe are both capable of receiving and retroreflective incident light from the scanning means;
signal translating means adapted to receive light retroreflected from the stripes and to produce electrical signals representative thereof;
said means associated with the object being further adapted when the object is in a position other than the first position to cause the second and third stripes to be presented to the scanning means and the first stripe to be no longer presented to the scanning means whereby the second and third stripes are then both capable of receiving and retroreflecting the light from the scanning means; and
decoding means coupled to the signal translating means and adapted to produce a signal indicating that the object is in the first position when an electrical signal is produced by the signal translating means in response to the first retroreflective stripe and the third retroreflective stripe receiving and retroreflecting the light from the scanning means, and to produce a signal indicating that the object is in a position other than the first position when an electrical signal is produced by the signal translating means in response to the second retroreflective stripe and the third retroreflective stripe receiving and retroreflecting the light from the scanning means.

13. An electro-optical mark sensing system operative to provide indications of a first position of an object relative to a body and a position of the object relative to the body other than the first position comprising:

first and second retroreflective stripes associated with the body;

scanning means adapted to scan the stripes with incident light;

means associated with the object and adapted when the object is in the first position to enable both of the stripes to receive and retroreflect incident light from the scanning means, and when the object is in a position other than the first position to prevent one of the stripes from receiving and retroreflecting incident light from the scanning means;

signal translating means adapted to receive light retroreflected from the stripes and to produce electrical signals representative thereof; and decoding means coupled to the signal translating means and adapted to produce a signal indicating that the object is in the first position when an electrical signal is produced by the signal translating means in response to both of the stripes receiving and retroreflecting the light from the scanning means, and to produce a signal indicating that the object is in a position other than the first position when an electrical signal is produced by the signal translating means in response to only one of the stripes receiving and retroreflecting the light from the scanning means.

14. An electro-optical mark sensing system operative to provide indications of a first position of an object relative to a body and a position of the object relative to the body other than the first position comprising:

first and second retroreflective stripes associated with the body;

scanning means for scanning the stripes with incident light;

means associated with the object and adapted when the object is in the first position to prevent one of the stripes from receiving and retroreflecting incident light from the scanning means, and when the object is in a position other than the first position to enable both of the stripes to receive and retroreflect incident light from the scanning means;

signal translating means adapted to receive light retroreflected from the stripes and to produce electrical signals representative thereof; and decoding means coupled to the signal translating means and adapted to produce a signal indicating that the object is in the first position when an electrical signal is produced by the signal translating means in response to only one of the stripes receiving and retroreflecting the light from the scanning means, and to produce a signal indicating that the object is in a position other than the first position when an electrical signal is produced by the signal translating means in response to both of the stripes receiving and retroreflecting the light from the scanning means.

15. An electro-optical mark sensing system operative to provide indications of a first position of an object relative to a body and a position of the first object relative to the body other than the first position comprising:

a first pair of retroreflective strips associated with the object;

a second pair of retroreflective stripes associated with the body;

the combination of retroreflectivity characteristics of the first and second stripes of the first pair of stripes differing from the combination of retroreflectivity characteristics of the corresponding first and second stripes of the second pair of stripes;

scanning means for scanning the stripes with incident light;

means associated with the object and adapted when the object is in the first position to enable the second pair of stripes only to receive and retroreflect light from the scanning means, and when the object is in a position other than the first position to enable the first pair of stripes only to receive and retroreflect the light from the scanning means and to prevent the second pair of stripes from receiving and retroreflecting the light from the scanning means;

signal translating means adapted to receive light retroreflected from the stripes and to produce electrical signals thereof; and decoding means coupled to the signal translating means and adapted to produce a signal indicating that the object is in the first position when an electrical signal is produced by the signal translating means in response to the second pair of stripes receiving and retroreflecting the light from the scanning means, and to produce a signal indicating that the object is in a position other than the first position when an electrical signal is produced by the signal translating means in response to the first pair of retroreflective stripes receiving and retroreflecting the light from the scanning means.

16. An electro-optical mark sensing system operative to provide indications of a first position of an object relative to a body and a position of the object relative to the body other than the first position comprising:

a first pair of retroreflective stripes associated with the object;

a second pair of retroreflective stripes associated with the body;

the combination of retroreflectivity characteristics of the first and second stripes of the first pair of stripes differing from the combination of retroreflectivity characteristics of the corresponding first and second stripes of the second pair of stripes;

scanning means for scanning the stripes with incident light;

means associated with the object and adapted when the object is in the first position to cause the first pair of stripes only to receive and retroreflect light from the scanning means, and when the object is in a position other than the first position to cause the second pair of stripes only to receive and retroreflect the light from the scanning means and to prevent the first pair of stripes from receiving and retroreflecting the light from the scanning means;

signal translating means adapted to receive light retroreflected from the stripes and to produce electrical signals representative thereof; and decoding means coupled to the signal translating means and adapted to produce a signal indicating that the object is in the first position when an electrical signal is produced by the signal translating means in response to the first pair of retroreflective stripes only receiving and retroreflecting the light from the scanning means, and to produce a signal indicating that the object is in a position other than the first position when an electrical signal is produced by the signal translating means in response to the second pair of retroreflective stripes only receiving and retroreflecting the light from the scanning means.

References Cited

UNITED STATES PATENTS

| | | |
|---|---|---|
| 2,906,885 | 9/1959 | Orthuber. |
| 2,999,152 | 9/1961 | Gallagher. |
| 3,253,126 | 5/1966 | Baughman _____ 340—146.3 X |
| 3,327,098 | 6/1967 | Riggin. |
| 3,417,231 | 12/1968 | Stites. |

DARYL W. COOK, Primary Examiner

R. M. KILGORE, Assistant Examiner

U.S. Cl. X.R.

235—61.12; 246—169; 340—146.3